US008868985B2

(12) United States Patent
Hackstein et al.

(10) Patent No.: US 8,868,985 B2
(45) Date of Patent: Oct. 21, 2014

(54) SUPERVISED FAULT LEARNING USING RULE-GENERATED SAMPLES FOR MACHINE CONDITION MONITORING

(75) Inventors: Holger Hackstein, Dietzenbach (DE); Claus Neubauer, Marloffstein (DE); Chao Yuan, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 397 days.

(21) Appl. No.: 13/394,919

(22) PCT Filed: Sep. 13, 2010

(86) PCT No.: PCT/US2010/048579
§ 371 (c)(1),
(2), (4) Date: Aug. 17, 2012

(87) PCT Pub. No.: WO2011/034805
PCT Pub. Date: Mar. 24, 2011

(65) Prior Publication Data
US 2012/0304008 A1 Nov. 29, 2012

Related U.S. Application Data

(60) Provisional application No. 61/243,300, filed on Sep. 17, 2009.

(51) Int. Cl.
*G06F 11/00* (2006.01)
*G05B 23/02* (2006.01)
(52) U.S. Cl.
CPC .......... *G05B 23/0229* (2013.01); *G05B 23/024* (2013.01)
USPC ........................................................... 714/48

(58) Field of Classification Search
CPC ............ G06F 17/5009; G06F 2217/16; G06F 11/2257
See application file for complete search history.

(56) References Cited

U.S. PATENT DOCUMENTS

| | | | |
|---|---|---|---|
| 7,424,619 B1 | 9/2008 | Fan et al. | |
| 8,150,106 B2 * | 4/2012 | Wu et al. | 382/112 |
| 8,249,830 B2 * | 8/2012 | Minhas et al. | 702/185 |
| 2005/0144537 A1 | 6/2005 | Cataltepe et al. | |
| 2010/0325487 A1 * | 12/2010 | Minhas et al. | 714/26 |

OTHER PUBLICATIONS

Stratigopoulos et al., "Enrichment of limited training sets in machine-learning-based analog/RF test", Design, Automation & Test in Europe Conference & Exhibition, 2009, IEEE, Piscataway, NJ, Apr. 20, 2009, pp. 1668-1673.
Nhalmi et al., "Counter-Example Generation-Based One-Class Classification", Sep. 17, 2007, Machine Learning: ECML 2007; (Lecture Notes in Computer Science), Springer Berlin Heidelberg, Berlin, pp. 543-550.

(Continued)

*Primary Examiner* — Charles Ehne

(57) ABSTRACT

A machine fault diagnosis system is provided. The system combines a rule-based predictive maintenance strategy with a machine learning system. A simple set of rules defined manually by human experts is used to generate artificial training feature vectors to portray machine fault conditions for which only a few real data points are available. Those artificial training feature vectors are combined with real training feature vectors and the combined set is used to train a supervised pattern recognition algorithm such as support vector machines. The resulting decision boundary closely approximates the underlying real separation boundary between the fault and normal conditions.

20 Claims, 5 Drawing Sheets

(56) References Cited

OTHER PUBLICATIONS

Wrest et al., "Instrument Surveillance and Calibration Verification Through Plant Wide Monitoring Using Autoassociative Neural Networks", The American Nuclear Society Int'l Topical Meeting on Nuclear Plant Instrumentation, Control and Human Machine Interface Technologies, May 6-9, 1996.

International Search Report dated Jan. 19, 2011.

* cited by examiner

SUPERVISED FAULT LEARNING USING RULE-GENERATED SAMPLES FOR MACHINE CONDITION MONITORING

CROSS REFERENCE TO RELATED APPLICATIONS

This application claims the benefit of U.S. Provisional Patent Application Ser. No. 61/243,300 entitled "Supervised Fault Learning Using Rule-Generated Samples for Machine Condition Monitoring," filed on Sep. 17, 2009, the contents of which are hereby incorporated by reference herein in their entirety. In addition, this application is the US National Stage of International Application No. PCT/U.S.2010/048579, filed Sep. 13, 2010 and claims the benefit thereof. All of the applications are incorporated by reference herein in their entirety.

FIELD OF THE INVENTION

The present invention relates generally to the field of machine condition monitoring, and more particularly, to the detection of machine problems at an early stage based on sensor data from a plurality of monitoring sensors.

BACKGROUND OF THE INVENTION

The goal of machine condition monitoring is to detect machine failures at an early stage so that maintenance can be carried out in a timely manner. There are several strategies in use to perform machine maintenance. In a first strategy called corrective maintenance, maintenance is performed only if the machine fails. In another strategy called preventive maintenance, maintenance is performed on a pre-scheduled basis. Those first two approaches are easy to implement, but do not provide the best efficiency.

The present disclosure focuses on a third strategy, called predictive maintenance or condition-based maintenance. According to that strategy, maintenance is performed only if necessary. Predictive maintenance offers the highest economic efficiency, but also presents the largest challenge: how to ascertain whether a machine is working normally or abnormally (i.e., in a fault condition or a condition requiring maintenance). Another challenge is that, in the case of failure, the cause of that failure must be determined so that corresponding localized maintenance can be applied.

There are fundamentally two ways to address the fault diagnosis task necessary to perform predictive maintenance. First, a rule-based technique is perhaps the most widely used condition monitoring approach. Rule-based machine monitoring systems are described, for example, in G. Schreiber, H. Akkermans, A. Anjewierden, R. de Hoog, N. Shadbolt, W. V. De Velde and B. Wielinga, "Knowledge Engineering and Management: The Common KADS Methodology" 187-214 (MIT Press 2000); and M. Todd, Stephen D. J. McArthur, James R. McDonald and S. J. Shaw, "A Semiautomatic Approach to Deriving Turbine Generator Diagnostic Knowledge," IEEE Trans. on Systems, Man, and Cybernetics, part C, vol. 37, no. 5 at 979-992 (2007).

In rule-based predictive maintenance, a set of rules is used to analyze features or conditions of a machine. The general format of those rules is "If a condition, then a fault type." Rules are typically derived by human experts who possess the knowledge of the underlying system model. Rules offer the user a transparency as to why a particular conclusion is reached via the exploration of the rule condition.

The design of accurate rules, however, is a very deliberate and time consuming process, especially for complex systems with many sensors and fault types. In one example, it required 80 man-years to develop one of the most commercially successful condition monitoring rule bases (L. Trave-Massuyes and R. Milne, "Gas-turbine condition monitoring using qualitative model-based diagnosis," IEEE Expert, vol. 12, no. 3 at 22-31 (May/June 1997)).

A second approach to condition monitoring is the use of machine learning. Supervised-pattern-recognition-based techniques such as neural networks have received much attention recently in that area (M. J. Embrechts, and S. Benedek, "Hybrid identification of nuclear power plant transients with artificial neural networks," IEEE Trans. on Industrial Electronics, vol. 51, no. 3 at 686-693 (June 2004)). Machine learning models are data-driven: they are learned from training data representing the normal condition and each of the fault types. This contrasts to the knowledge-based rule approach.

Machine learning algorithms can be learned very fast (for example, in minutes), are very accurate and are easily transferable between different machines. An obstacle to the extensive use of machine learning, however, is that it is usually difficult to obtain a sufficiently large training dataset. Obtaining training data representing the normal condition is usually straightforward because a machine typically operates normally during most of its lifespan. Obtained training data representing each of the fault types, however, is challenging because certain types of faults may occur only rarely, even if data from multiple similar machines is considered.

Several efforts have been made to combine supervised machine learning with a rule-based model. For example, in Z. Wang, Y. Liu and P. J. Griffin, "A combined ANN and expert system tool for transformer fault diagnosis," IEEE Power Engineering Society Winter Meeting 1261-1269 (2000), the results from a neural network are combined with a rule base. There is no attempt to improve either the neural network or the rule base. In M. Todd, Stephen D. J. McArthur, James R. McDonald and S. J. Shaw, "A Semiautomatic Approach to Deriving Turbine Generator Diagnostic Knowledge," IEEE Trans. on Systems, Man, and Cybernetics, Part C, vol. 37, no. 5 at 979-992 (2007), machine learning is used to assist the design of rules.

There is presently a need to overcome the above described limitations of existing machine monitoring solutions where only limited fault data is available. There is furthermore a need for a machine monitoring solution that incorporates advantages from both rule-based systems and machine learning systems, while overcoming the most serious limitations of those systems.

SUMMARY OF THE INVENTION

The present invention addresses the needs described above by providing a method for classifying a measured feature vector as representing one of a normal machine condition and a fault machine condition, the measured feature vector including a set of feature states relating to a machine at a particular time. A set of manually defined rules is received, each rule establishing a set of feature state ranges indicating one of the normal machine condition and the fault machine condition. Using probability distributions over the feature state ranges to sample the manually defined rules, a set of artificial sample feature vectors is generated, each artificial sample feature vector including an annotation indicating one of the normal machine condition and the fault machine condition.

A training set of actual feature vectors is annotated by assigning an annotation to each actual feature vector of the training set, the annotation indicating one of the normal machine condition and the fault machine condition. A supervised pattern recognition algorithm is trained using an enhanced training set comprising the training set of actual feature vectors and the set of artificial sample feature vectors. A test feature vector is then classified using the trained supervised pattern recognition algorithm.

The supervised pattern recognition algorithm may be a Support Vector Machines algorithm. The probability distributions may comprise a uniform probability distribution, or may comprise a one-sided Gaussian probability distribution. The method may include constructing a hierarchical tree structure based on the rules.

At least one of the feature states may be a residual value obtained from a state estimation model, or may be an observed value received from a sensor. The annotation of a training set of actual feature vectors may include simultaneously annotating sets of feature vectors relating to a particular time interval and having a same machine condition.

In another embodiment of the invention, a non-transitory computer-usable medium has computer readable instructions stored thereon for execution by a processor to perform a method as described above. Another embodiment is a machine monitoring system for classifying a measured feature vector as representing one of a normal machine condition and a fault machine condition.

DESCRIPTION OF THE INVENTION

Figure 1:
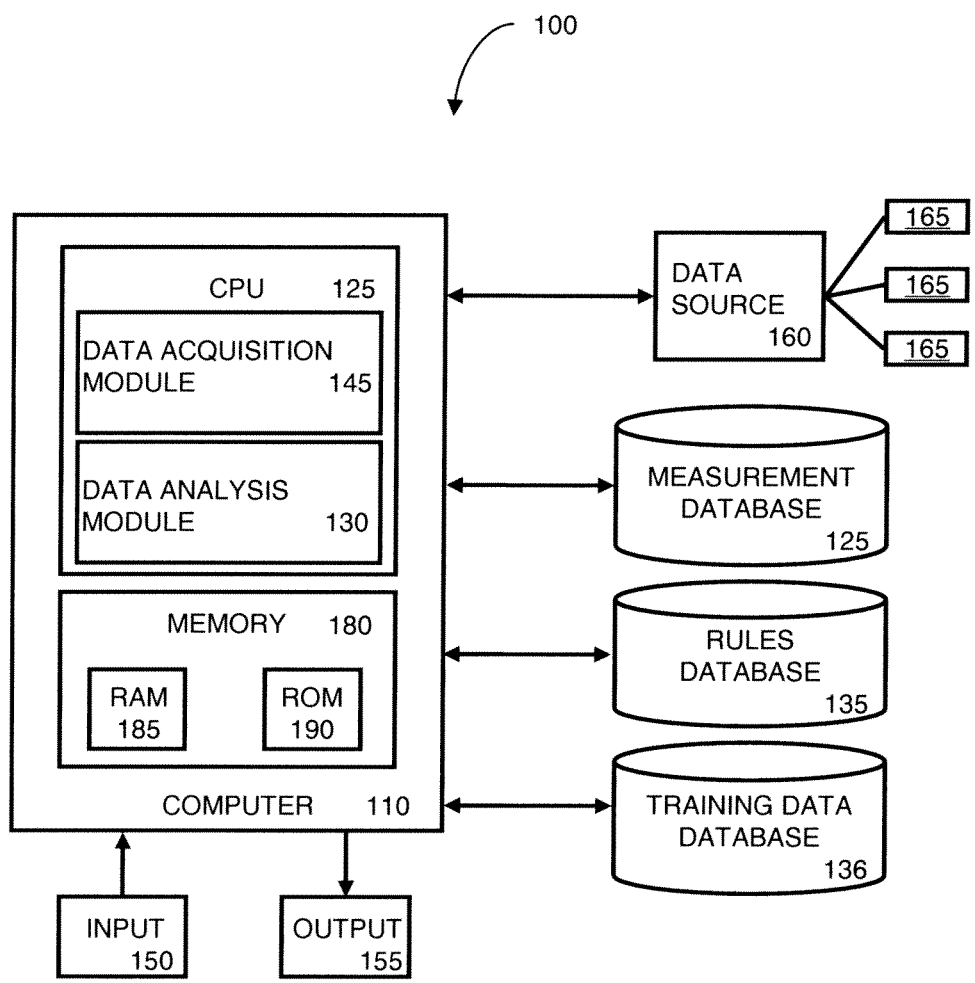
FIG. 1 is schematic illustration of a computer system in accordance with the present disclosure.

A machine monitoring system 100 for collecting and processing machine monitoring data according to an exemplary embodiment of the present invention is illustrated in FIG. 1. In the system 100, a computer 110 performs steps of the disclosed method together with other tasks. While a single computer 110 is shown, one skilled in the art will recognize that the disclosed steps may be performed by a plurality of computers linked by a network or a bus.

The computer 110 receives data from a plurality of sensors 165 that may be connected to the computer through one or more data sources 160 such as data loggers. The sensors 165 are arranged to simultaneously acquire data to create a vector representing the condition of a machine at a given point in time. The raw sensor data may be processed or combined, and is stored in a measurement database 125, along with timestamps or other temporal identifiers or indexes.

The computer 110, which may be a portable or laptop computer or a mainframe or other computer configuration, includes a central processing unit (CPU) 125 and a memory 180. The computer 110 is connected to an input device 150 and an output device 155. The CPU 125 includes one or more data acquisition modules 145 that are configured for performing one or more methods for collecting, processing and storing sensor data.

The CPU additionally contains one or more data analysis modules 130 containing algorithms for monitoring one or more machines by analyzing data collected from the sensors 165. The data analysis modules perform predictive maintenance tasks including the detection of events that may indicate a deviation from a normal operating condition. As described in more detail below, the data analysis module utilizes manually defined rules that may be stored in a rules database 135. The rules relate data values with machine conditions. The data analysis module also utilizes sensor measurement training data that may be stored in a training data database 136.

The memory 180 includes a random access memory (RAM) 185 and a read-only memory (ROM) 190. The memory 180 may also include removable media such as a disk drive, tape drive, etc., or a combination thereof. The RAM 185 functions as a data memory that stores data used during execution of programs in the CPU 125 and is used as a work area. The ROM 190 functions as a program memory for storing a program executed in the CPU 125. The program may reside on the ROM 190 or on any other non-volatile computer-usable medium as computer readable instructions stored thereon for execution by the CPU 125 or other processor to perform the disclosed methods. The ROM 190 may also contain data for use by other programs.

The input 150 may be a keyboard, mouse, network interface, etc., and the output 255 may be a liquid crystal display (LCD), cathode ray tube (CRT) display, printer, etc. The computer 110 may be connected to a network, with all commands, input/output and data being passed via the network. The computer 110 may be configured to operate and display information by using, e.g., the input 250 and output 255 devices to execute certain tasks.

Presently disclosed is a fault diagnosis system that combines the merits of both the "rule" and the "machine learning" approaches described above. In particular, a supervised machine learning approach is presented to distinguish a normal condition from one or many fault conditions.

Ordinarily, a large number of training samples is available for the normal operating condition of a machine, and those samples are easily acquired from a long normal operation period of the machine. The number of training samples for a certain fault, however, is often very limited. The presently described technique augments the original real training set for a particular fault with artificial samples generated by rules. In that approach, the rules are not required to be very accurate, as is required by a commercial rule-based system. The rules can therefore be easily and quickly designed. A machine learning model is trained using a combination of an original real training set and the artificial training set. The resulting machine learning model performs better than either the machine learning model trained using only the real training set, or using the rule-base system alone.

Annotation of Real Training Samples

Real training samples used in the presently described system are obtained by user annotation. The user indicates whether the machine is working normally, or is having a particular fault at a certain timestamp. That can be done, for example, through a graphical user interface such as the input 150 and output 155 (FIG. 1). The user simply selects the time stamp or period using a mouse and annotates the selected period as "fault" or "normal." That annotation process can be done iteratively many times.

Once a time stamp $t_n$ is annotated, a feature vector $x_n$ is formed representing the information at that timestamp. The ith dimension of $x_n$, or $x_{ni}$, is a feature. The selection of a feature is machine and problem specific. For example, a feature can be the observed value of an original sensor (e.g., temperature, pressure) at timestamp $t_n$. A feature can be the residual (the deviation between the observed value and estimated value) obtained from a state estimation model such as that described in U.S. Pat. No. 7,565,262 entitled "Bayesian sensor estimation for machine condition monitoring" by C. Yuan and C. Neubauer, the contents of which are hereby incorporated herein in their entirety. A feature may be derived from measurements using equations or filtering. In general, a feature can be any raw or preprocessed results.

Each feature vector $x_n$ is associated with an annotation or label $y_n$, which is 1 if the annotation is "fault" and −1 if the annotation is "normal." Note that if the user selects too many training feature vectors and some of them are very similar to each other, a clustering algorithm, such as k-mean, may be applied to cluster those data and only use the cluster centers for training. That step reduces the training complexity.

Supervised Fault Learning

Based on the training data comprising N feature vectors $x_n$ and corresponding labels $y_n$, where n=1, 2, 3, . . . , N, any supervised pattern recognition algorithm may be applied to distinguish the fault condition from the normal condition. In the example embodiment described herein, support vector machines (SVM) is used due to its proven classification performance. That algorithm is described in C. Cortes and V. Vapnik, "Support Vector Networks," Machine Learning, V. 20 at 273-297 (1995), the contents of which are hereby incorporated herein in their entirety.

After training, the SVM produces an evaluation function f(x). For a test feature vector x at timestamp t, its diagnosis result y is computed as follows: if f(x)>0, y=1, which means that at time t, the machine has the corresponding fault. Otherwise, if f(x)<0, y=−1, which means that at time t, the machine is working normally. The manifold where f(x)=0 is often referred to as a decision boundary. The decision boundary gives the intuitive meaning of how classification is performed: the space on one side of the decision boundary belongs to one class; while the space on the other side of the decision boundary belongs to the other class.

Figure 2:
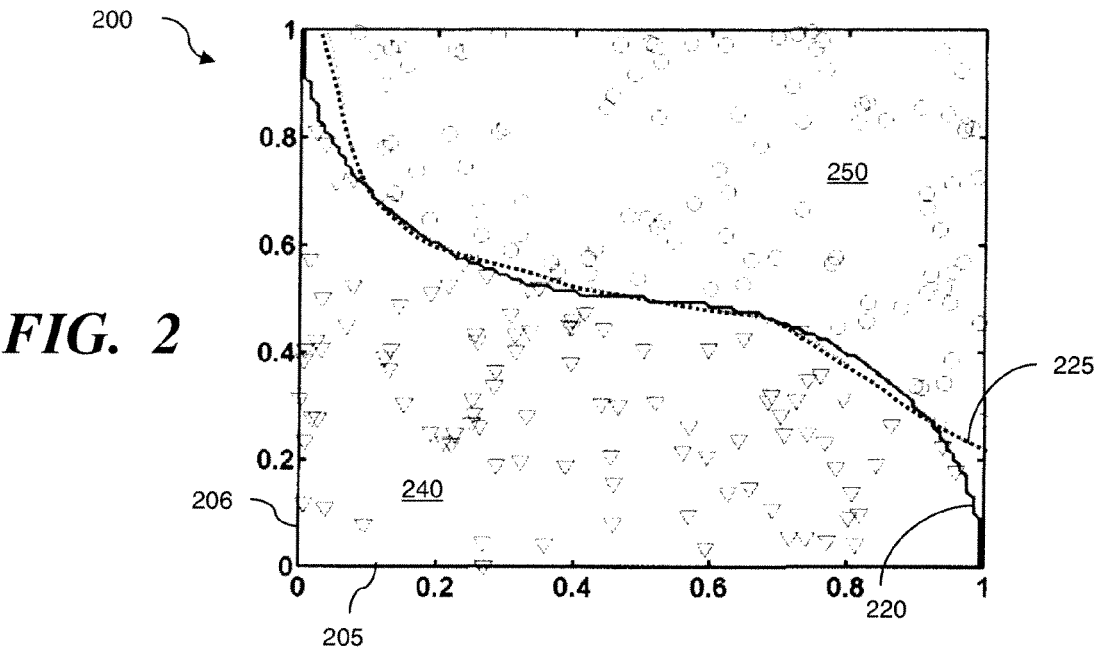
FIG. 2 is a plot of training data and a resulting decision boundary produced by an SVM classifier where a large collection of training data is available.

The graph 200 of FIG. 2 shows an example of how the SVM classifies feature vectors. Suppose that the horizontal and vertical axes 205, 206 represent the sensor residual (deviation) for two temperature sensors, respectively. It would be desirable that these residuals be small if the machine is operating normally Otherwise, the machine is in a fault condition. The actual boundary separating the normal condition from the fault is indicated as the black solid line 220. This separating boundary means that if a feature vector is located on the top right of this boundary (residuals are large), there is a fault. Otherwise, the machine is operating normally.

Suppose that there are 100 training feature vectors representing the normal condition (triangles 240 of FIG. 2). Those data points are easily obtained. The label for each of those vectors is −1.

Suppose for now that there are also available 100 training features vectors for the fault (circles 250 of FIG. 2). The label for each of those vectors is 1. After training the SVM using those 200 feature vectors and their labels, the decision boundary is obtained as dotted line 225 in FIG. 2. The learned decision boundary 225 is very close to the real separating boundary 220, suggesting that the learned SVM can produce very accurate fault diagnosis result if there are sufficient training data representing the fault (100 samples in this case).

Figure 3:
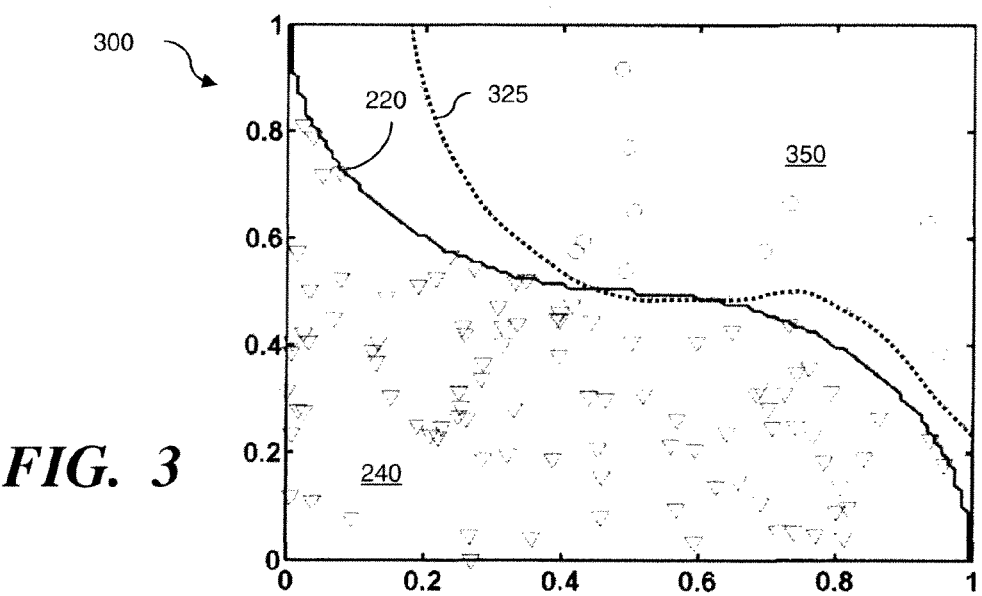
FIG. 3 is a plot of training data and a resulting decision boundary produced by an SVM classifier where only a small number of fault training data is available.

In the more realistic case shown in the graph 300 of FIG. 3, there are insufficient training samples for the fault. The graph 300 contains only 10 samples (circles 350 of FIG. 3). For purposes of this illustration, those 10 samples were randomly selected from the 100 training samples 250 representing the fault as shown in FIG. 2. The graph 300 of FIG. 3 shows the decision boundary 325 produced by the SVM when trained on those ten samples 350 plus the hundred training samples 240 representing the normal condition, for a total of one hundred ten training feature vectors. Clearly, the decision boundary 325 is now quite different from the underlying separating boundary 220, suggesting more errors will be introduced if this insufficiently trained SVM is used. Therefore, realistically, a supervised machine learning algorithm cannot rely on the user annotated training data to achieve a good diagnosis result.

Generating Artificial Training Samples from Rules

As with the supervised machine learning method, the conditions defined by rules can also be viewed as ways to specify the decision boundary. The major difference is that a decision boundary based on a rule is defined manually by human experts, but the decision boundary produced by a supervised machine learning method is learned automatically from training data.

Figure 4:
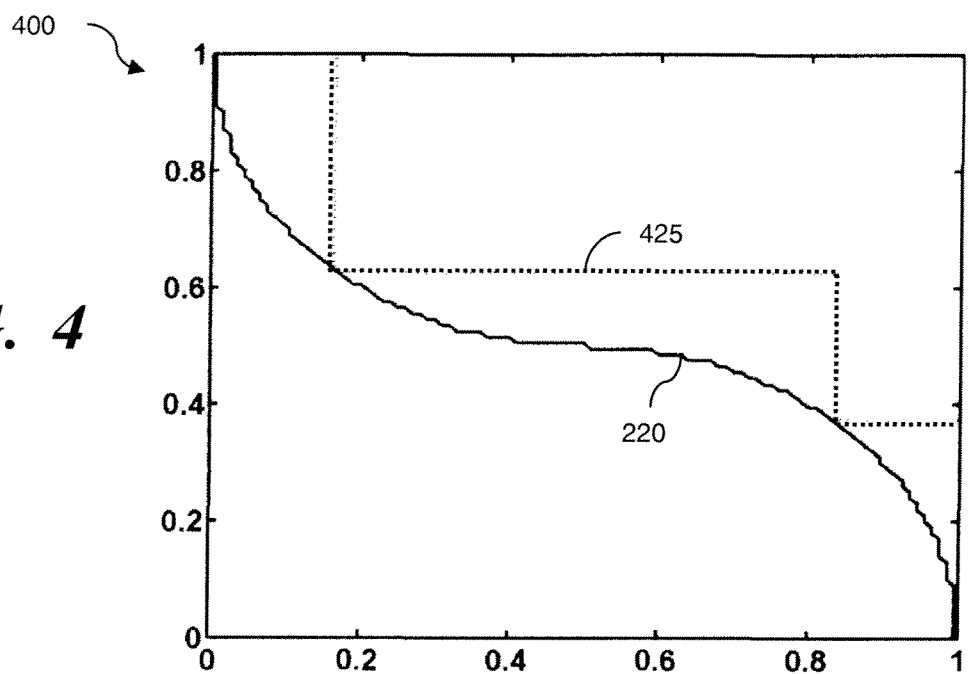
FIG. 4 is a plot of a decision boundary according to a theoretical set of rules.

A decision boundary 425 defined by rules is shown in the graph 400 of FIG. 4. Because the underlying real separating boundary is highly nonlinear, it is difficult to describe the rule conditions to exactly match the separating boundary. As shown by the decision boundary 425, the rule is defined as:

$$\text{If (residual1>0.16 AND residual2>0.62) OR (residual1>0.83 AND residual2>0.37) Then this is the fault.} \qquad (1)$$

The rule defines feature state ranges that, in combination, define fault conditions. Note that the higher the residuals are, the more likely there is a fault. It is possible to add more conditions to fit the real separating boundary better; however, that requires more time and effort. In realistic applications, there are hundreds of features involved in defining the condition, making the successful rule design very challenging.

Although a simple rule such as the rule (1) shown above doesn't work well by itself, it does provide useful information, coming from expert knowledge, about the real fault data distribution. The present disclosure proposes sampling artificial training data from simple rules and using that sampled training data to train a supervised machine learning algorithm.

Figure 5:
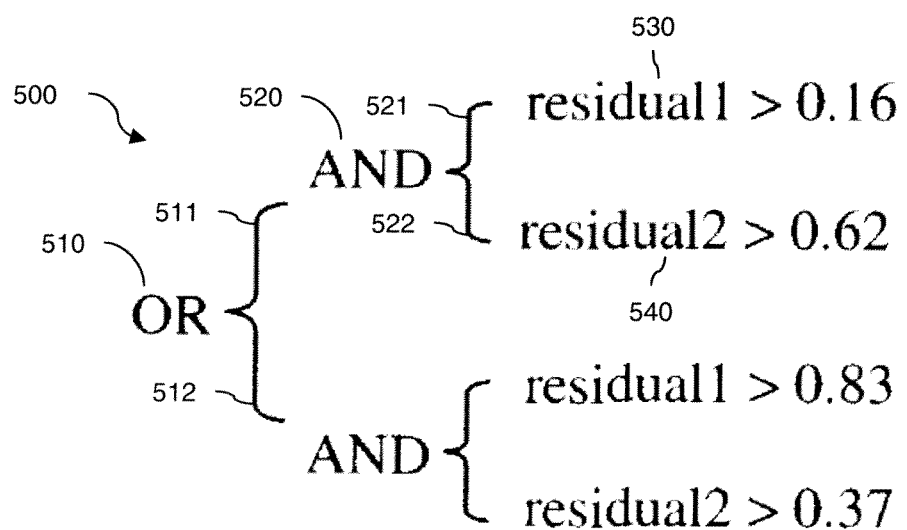
FIG. 5 is a hierarchical tree structure showing the theoretical set of rules represented in FIG. 4.

Generally speaking, a rule condition can be written in a hierarchical tree structure such as tree structure 500 shown in FIG. 5. In the following exemplary sampling based on the tree structure 500, sampling is done from left to right as follows:

Case (A): For an "OR" connector 510 having a number M of branches or children 511, 512, a categorical distribution is assumed, with each child having a probability of 1/M. A child (a branch) is randomly selected to continue sampling of that child.

Case (B): For an "AND" connector such as connector 520 having a number L of branches or children 521, 522, each child is sampled simultaneously and the results are combined.

Case (C): For a leaf node such as comparison 530 "residual1>0.16," several alternative sampling strategies may be used. In a uniform sampling strategy, an additional bound for the feature must be specified to further define the feature state range. For example, in the case of comparison 530 (residual1) the upper bound is 1 and the limits 0.16<residual1<1 are used. The interval between 0.16 and 1 is sampled uniformly. In another example sampling strategy, a Gaussian distribution is used. In that case, a variance of the Gaussian distribution $\sigma^2$ must be specified, and the feature state range for residual1 is sampled using the one-sided Gaussian distribution with mean 0.16 and variance $\sigma^2$. In the present example, the uniform sampling strategy is used.

To create a sample feature vector from the rule (1) as represented by the tree structure 500, computation begins from the root, or the left side as shown in FIG. 5. Because the root 510 is an "OR" whose number of children M=2, case (A) is used. The categorical distribution is sampled with M=2 categories, with each category having a probability 1/M=0.5. For purposes of the present illustration, sampling yielded the first branch 511 so the first child 520 is sampled.

Because that child 520 is an "AND" whose number of children L=2, case (B) is used, wherein each child 530, 540 is sampled simultaneously and the results are combined. The first child 530 "residual1>0.16" is a leaf node and therefore falls under case (C). Sampling the uniform distribution from the range 0.16 to 1 yields residual1=0.5 in this case.

The second child 540 "residual2>0.62" is also a leaf node and therefore also falls under case (C). Sampling the uniform distribution from the range 0.62 to 1 in this example yields residual2=0.8. The result is one artificial training feature vector $[0.5\ 0.8]^T$. The process is repeated until the required number of samples is produced.

Figure 6:
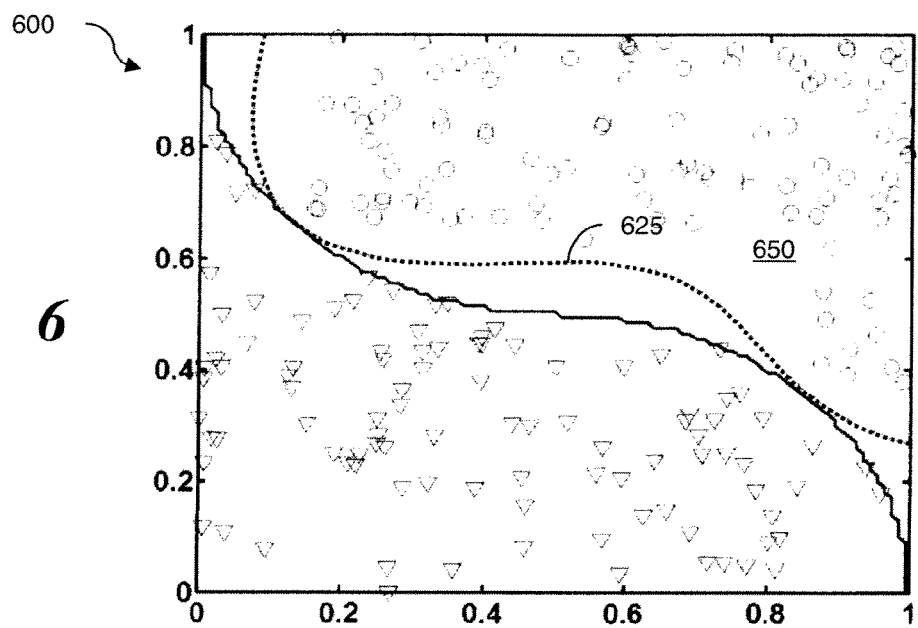
FIG. 6 is a plot of training data and a resulting decision boundary produced by an SVM classifier where fault training data is generated using a theoretical set of rules.

One hundred artificial samples 650 generated through the above rule-based procedure are shown as circles in the graph 600 of FIG. 6. Using those samples 650, the SVM produces a slightly better decision boundary 625 than the decision boundary 425 (FIG. 4) produced using the rule alone.

Supervised Fault Learning Using the Combined Training Set

Figure 7:
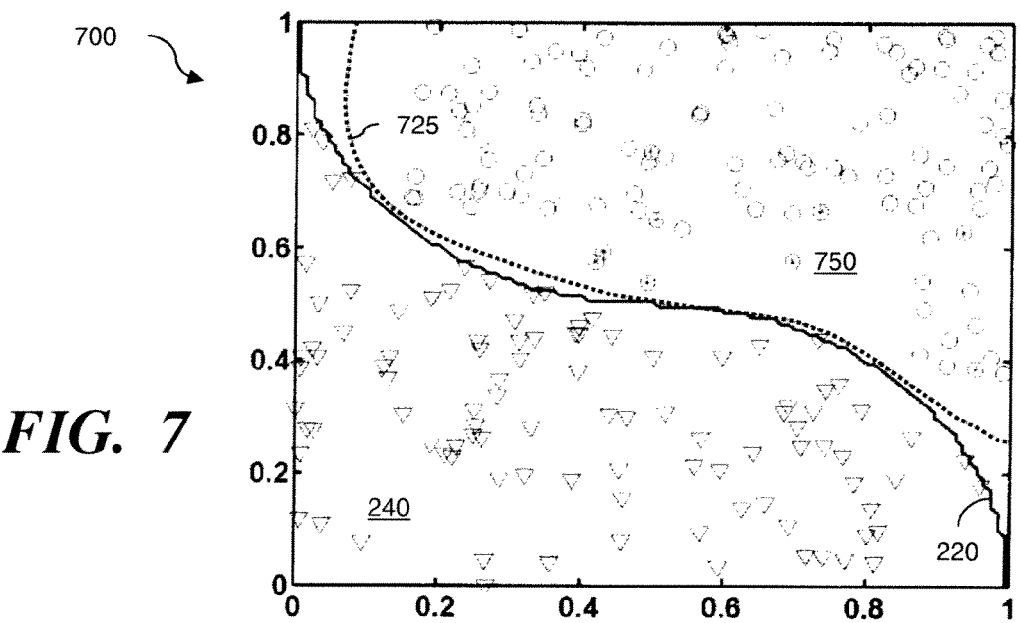
FIG. 7 is a plot of training data and a resulting decision boundary produced by an SVM classifier where fault training data is a combination of data generated using a theoretical set of rules and measured data.

The original training set representing the fault is now combined with the artificial training samples generated by rules and the combined training set shown in graph 700 of FIG. 7 is used to train the supervised machine learning algorithm. Continuing the example above, there are 10 actual training samples (shown as circles 350 in FIG. 3) and 100 artificial training samples (shown as circles 650 in FIG. 6) representing the fault. Those two sets are combined to produce a set 750 represented in the graph 700 by circles and dotted circles (FIG. 7). Also used by the SVM are the 100 actual training samples representing the normal condition (shown as triangles in FIGS. 3, 6, 7). The new decision boundary 725, shown in FIG. 7, more closely approximates the underlying separating boundary 220 than decision boundaries produced from other data as described above. Specifically, the new decision boundary 725 improves over the boundary 325 produced using the actual training sample (FIG. 3), the boundary 425 produced using the simple rules only (FIG. 4) and the boundary 625 produced using only the artificial samples to represent the fault (FIG. 6).

Figure 8:
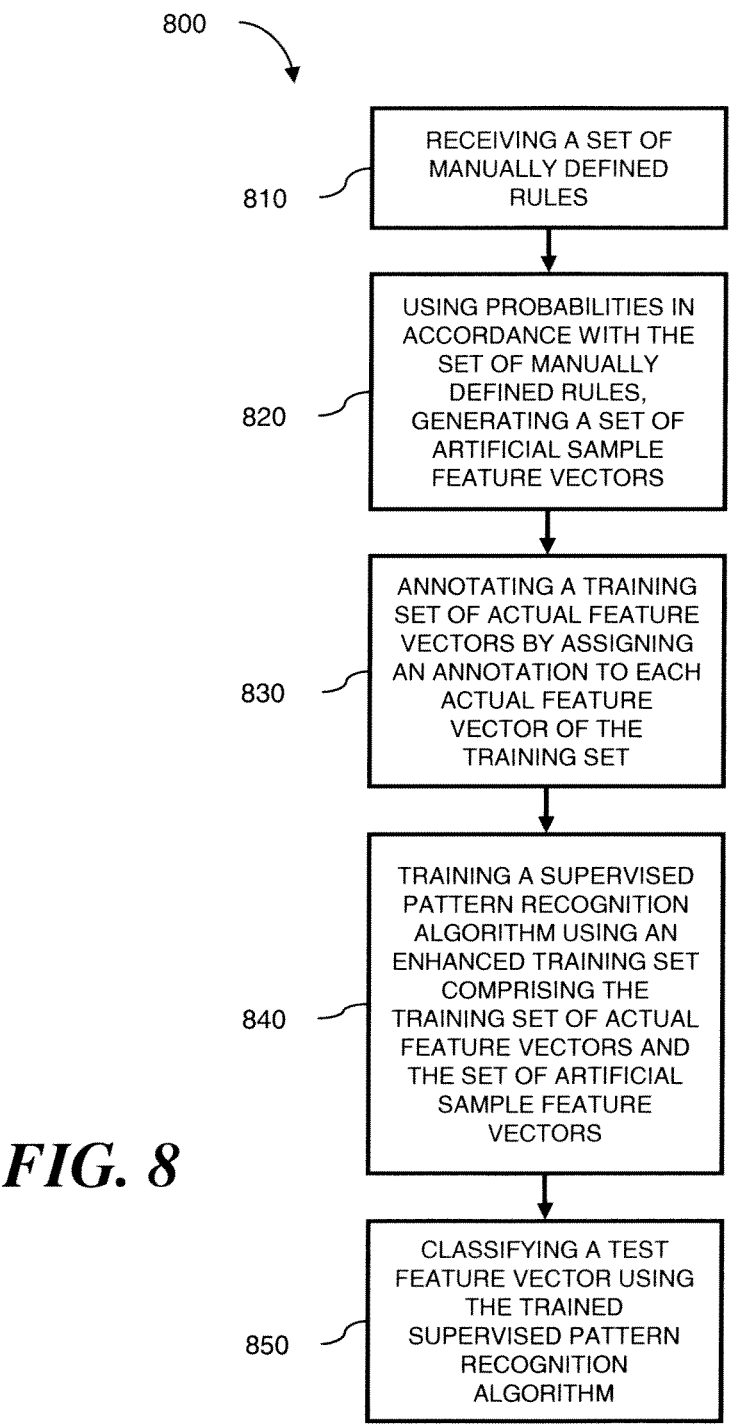
FIG. 8 is a block diagram illustrating work flow in a data collection and analysis system according to one embodiment of the invention.

A method 800, shown in FIG. 8, summarizes the work flow of the disclosed method. A set of manually defined rules is received 810. The rules may be manually created by an expert having knowledge of machine performance and an understanding of how machine faults are evidenced by sensor readings. As noted, the rules may be very simple and need not produce a decision boundary closely following the underlying separation boundary between the fault and normal conditions. Each of the rules establishes a set of feature state ranges indicating one of the normal machine condition and the fault machine condition. The rules may be manually input through a user input 150 (FIG. 1), or may be loaded from a database 135 of such rules.

Using probabilities in accordance with the set of manually defined rules, a set of artificial sample feature vectors is generated 820 in accordance with a technique as exemplified above. That is done by using probabilities to select decision branches, and by using probability distributions over feature state ranges to sample the rules. A probability distribution such as a uniform distribution or a Gaussian distribution is used. Each artificial sample feature vector includes an annotation indicating one of the normal machine condition and the fault machine condition.

Additionally, a training set of actual feature vectors is annotated by assigning an annotation to each actual feature vector of the training set. The annotation indicates one of the normal machine condition and the fault machine condition. The feature vectors may be annotated in groups by selecting time periods including feature vectors having the same machine condition (normal or fault) and annotating those feature vectors simultaneously.

A supervised pattern recognition algorithm is trained 840 using an enhanced training set that includes the training set of actual feature vectors and the set of artificial sample feature vectors. The algorithm may be SVM. The system can then classify 850 a test feature vector using the trained supervised pattern recognition algorithm. The foregoing Detailed Description is to be understood as being in every respect illustrative and exemplary, but not restrictive, and the scope of the invention disclosed herein is not to be determined from the Description of the Invention, but rather from the Claims as interpreted according to the full breadth permitted by the patent laws. For example, while Gaussian and uniform sampling strategies are illustrated for sampling leaves of a rule tree, other probability distributions may be used while remaining within the scope of the invention. In another example, the present disclosure illustrates a supervised pattern recognition algorithm using SVM, but other algorithms may be used. It is to be understood that the embodiments shown and described herein are only illustrative of the principles of the present invention and that various modifications may be implemented by those skilled in the art without departing from the scope and spirit of the invention.

What is claimed is:

1. A method for classifying a measured test feature vector as representing one of a normal machine condition and a fault machine condition, the measured test feature vector including a set of feature states relating to a machine at a particular time, the method comprising:

receiving a manually defined rule establishing a set of feature state ranges indicating the fault machine condition;

using probability distributions over the feature state ranges indicating the fault machine condition to sample feature state ranges established by the manually defined rule, generating a set of artificial sample feature vectors independently of a training set of measured training feature vectors, each artificial sample feature vector including an annotation indicating the fault machine condition;

annotating the training set of measured training feature vectors by assigning an annotation to each measured training feature vector of the training set, the annotation indicating one of the normal machine condition and the fault machine condition;

training a supervised pattern recognition algorithm using an enhanced training set comprising the training set of measured training feature vectors and the set of artificial sample feature vectors; and classifying the measured test feature vector using the trained supervised pattern recognition algorithm.

2. The method of claim 1, wherein the supervised pattern recognition algorithm is a Support Vector Machines algorithm.

3. The method of claim 1, wherein the probability distributions comprise a uniform probability distribution.

4. The method of claim 1, wherein the probability distributions comprise a one-sided Gaussian probability distribution.

5. The method of claim 1, wherein generating a set of artificial feature vectors further includes constructing a hierarchical tree structure based on the rules.

6. The method of claim 1, wherein at least one of the feature states is a residual value obtained from a state estimation model.

7. The method of claim 1, wherein at least one of the feature states is an observed value received from a sensor.

8. The method of claim 1, wherein annotating a training set of measured training feature vectors comprises annotating sets of feature vectors in groups relating to a particular time interval and having a same machine condition.

9. A machine monitoring system including a classifier for classifying a measured test feature vector as representing one of a normal machine condition and a fault machine condition, the measured test feature vector including a set of feature states relating to a machine at a particular time, comprising:

input means for receiving a manually defined rule establishing a set of feature state ranges indicating the fault machine condition;

means for generating a set of artificial sample feature vectors independently of a training set of measured training feature vectors using probability distributions over the feature state ranges indicating the fault machine condition to sample feature state ranges established by the set of manually defined rules, each artificial sample feature vector including an annotation indicating the fault machine condition;

means for annotating the training set of measured training feature vectors by assigning an annotation to each measured training feature vector of the training set, the annotation indicating one of the normal machine condition and the fault machine condition;

means for training a supervised pattern recognition algorithm using an enhanced training set comprising the training set of measured training feature vectors and the set of artificial sample feature vectors;

measurement means for measuring the measured test feature vector; and means for classifying the measured test feature vector using the trained supervised pattern recognition algorithm.

10. The machine monitoring system of claim 9, wherein the supervised pattern recognition algorithm is a Support Vector Machines algorithm.

11. The machine monitoring system of claim 9, wherein the probability distributions comprise a uniform probability distribution.

12. The machine monitoring system of claim 9, wherein the probability distributions comprise a one-sided Gaussian probability distribution.

13. The machine monitoring system of claim 9, wherein generating a set of artificial feature vectors further comprises constructing a hierarchical tree structure based on the rules.

14. The machine monitoring system of claim 9, wherein at least one of the feature states is a residual value obtained from a state estimation model.

15. The machine monitoring system of claim 9, wherein at least one of the feature states is an observed value received from a sensor.

16. The machine monitoring system of claim 9, wherein the means for annotating a training set of measured training feature vectors comprises means for annotating sets of feature vectors in groups relating to a particular time interval and having a same machine condition.

17. A non-transitory computer-usable medium having computer readable instructions stored thereon for execution by a processor to perform the method as claimed in claim 1.

18. The non-transitory computer-usable medium of claim 17, wherein the supervised pattern recognition algorithm is a Support Vector Machines algorithm.

19. The non-transitory computer-usable medium of claim 17, wherein the probability distributions comprise a uniform probability distribution.

20. The non-transitory computer-usable medium of claim 17, wherein the probability distributions comprise a one-sided Gaussian probability distribution.

* * * * *